US007336955B2

(12) United States Patent
Machida et al.

(10) Patent No.: US 7,336,955 B2
(45) Date of Patent: Feb. 26, 2008

(54) INTERCONNECTION AGREEMENT DETERMINING SYSTEM, APPARATUS, AND METHOD

(75) Inventors: Keiji Machida, Yokohama (JP); Tooru Hasegawa, Yokosuka (JP); Mayumi Takahashi, Yokohama (JP); Takeshi Ujino, Yokohamaa (JP)

(73) Assignee: NTT DoCoMo, Inc., Tokyo (JP)

( * ) Notice: Subject to any disclaimer, the term of this patent is extended or adjusted under 35 U.S.C. 154(b) by 13 days.

(21) Appl. No.: 11/017,719

(22) Filed: Dec. 22, 2004

(65) Prior Publication Data

US 2005/0143076 A1 Jun. 30, 2005

(30) Foreign Application Priority Data

Dec. 25, 2003 (JP) ............................. 2003-430137

(51) Int. Cl.
H04Q 7/20 (2006.01)
(52) U.S. Cl. ...................... 455/445; 455/466; 455/433; 379/221.13
(58) Field of Classification Search ................ 455/445, 455/466, 412.1–2, 433, 560, 410–411; 379/221.13, 379/88.22; 370/352–360
See application file for complete search history.

(56) References Cited

U.S. PATENT DOCUMENTS 6,064,887 A * 5/2000 Kallioniemi et al. ........ 455/445
6,161,017 A * 12/2000 Britt et al. ................... 455/445
6,226,517 B1 * 5/2001 Britt et al. ................... 455/445
6,240,296 B1 * 5/2001 Yu et al. ...................... 455/466
6,463,055 B1 * 10/2002 Lupien et al. ............... 370/353
6,611,516 B1 * 8/2003 Pirkola et al. ............... 370/352
6,633,764 B1 * 10/2003 Garcia ......................... 455/466
6,731,926 B1 * 5/2004 Link et al. ................ 455/412.2
6,839,421 B2 * 1/2005 Esparza et al. ......... 379/220.01
6,873,849 B2 * 3/2005 de la Red et al. .......... 455/445
6,917,813 B2 * 7/2005 Elizondo ..................... 455/466
2003/0013464 A1 1/2003 Labordere

FOREIGN PATENT DOCUMENTS

| EP | 1 453 328 A1 | 9/2004 |
| JP | 5-260094 | 10/1993 |
| JP | 2001-16632 | 1/2001 |
| JP | 2002-503404 | 1/2002 |
| WO | WO 98/18270 | 4/1998 |

OTHER PUBLICATIONS

Japanese Office Action dated Jul. 10, 2007.

* cited by examiner

Primary Examiner—Sharad Rampuria
(74) Attorney, Agent, or Firm—Crowell & Moring LLP (57) ABSTRACT

When a location-area MSC 20 receives an SMS originating signal, an interrogating unit 21 sends an SRIforSM signal including the MSISDN of a receiving terminal 10b to an HLR 30. When the location-area MSC 20 receives an SRIforSMack signal from the HLR 30, a subscriber-identification-information obtaining unit 22 obtains an IMUI contained in the SRIforSMack. An on-origination carrier identifying unit 23 identifies from the IMUI the carrier to which the receiving terminal 10b subscribes. The location-area MSC 20 determines whether the carriers have an SMS interconnection agreement with each other, on the basis of identification made by an on-origination carrier identifying unit 23.

3 Claims, 3 Drawing Sheets

INTERCONNECTION AGREEMENT DETERMINING SYSTEM, APPARATUS, AND METHOD

BACKGROUND OF THE INVENTION

1. Field of the Invention

The present invention relates to an interconnection agreement determining system, apparatus, and method that, in short message service originating and terminated control in mobile communication networks, make determination as to whether carriers have a short message service interconnection agreement with each other and that are compatible with number portability.

2. Description of the Related Art

The Short Message Service (SMS) has been provided as a communication service in mobile communication networks. The short message service is a message exchange service through which communication terminals can exchange text data having a limited length.

If an originating terminal which wants to send a short message and a receiving terminal to which the short message is directed subscribe to different carriers, they cannot send or receive the short message unless the carries have a short message service interconnection agreement (hereinafter referred to as an "SMS interconnection agreement") with each other.

Therefore, a mobile switching center in the location area that has received a request for transferring a short message from an originating terminal must determine whether the carrier to which the originating terminal subscribes and the carrier to which the receiving terminal subscribes have an SMS interconnection agreement with each other. The mobile switching center performs control operations such as transferring the short message received to a Short Message Service Center (SMSC) only if the mobile switching center determines that the carriers have such an agreement with each other.

Figure 4:
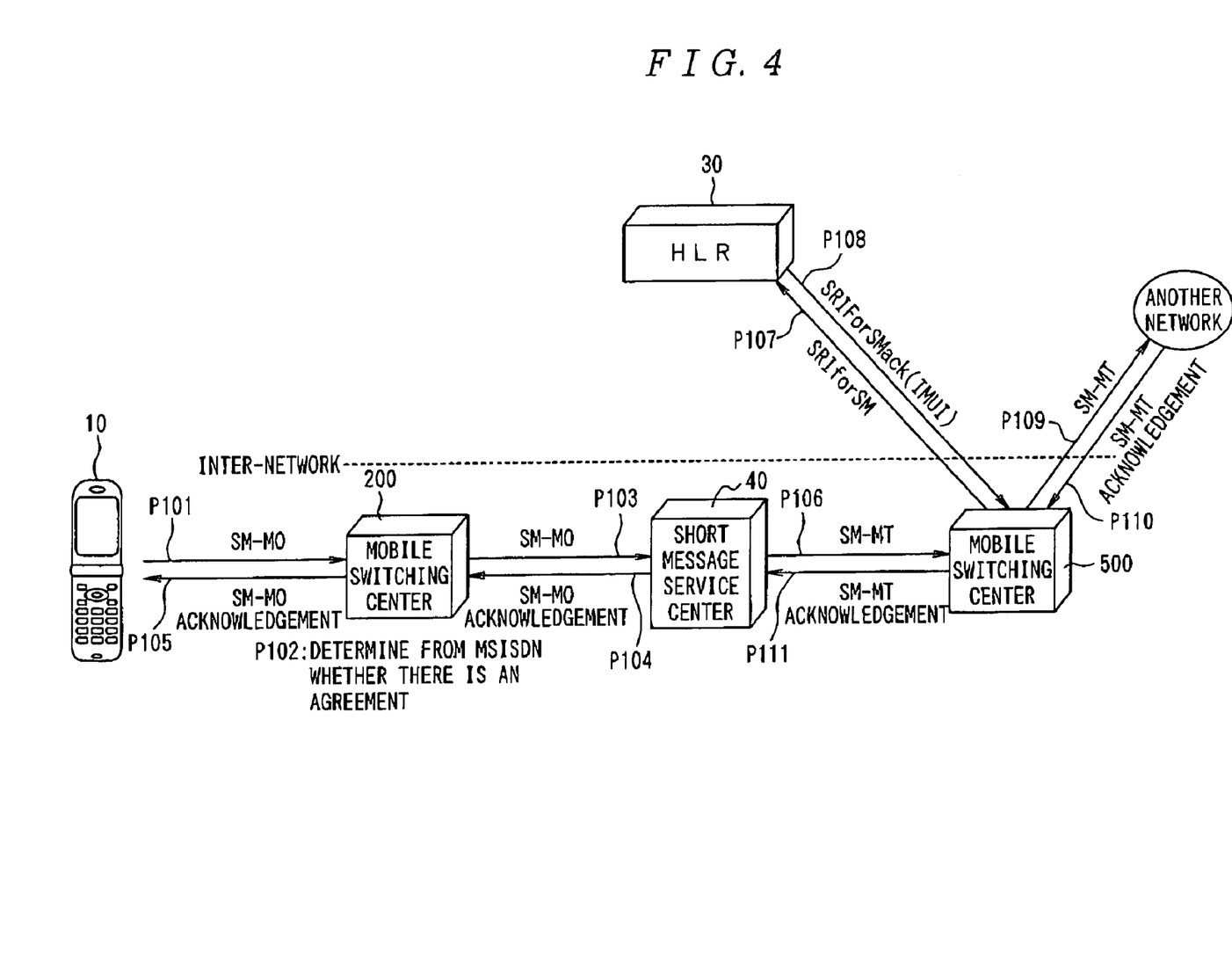
FIG. 4 is a block diagram illustrating a conventional SMS originating and terminated control procedure.

FIG. 4 shows a conventional SMS originating and terminated control procedure. The SMS originating and terminated control procedure includes two procedures: an SMS originating (Short-Message-Mobile-Originating: SM-MO) control procedure for sending a message from an originating terminal to a short message center and an SMS terminated (Short-Message-Mobile-Terminated: SM-MT) control procedure for receiving, by a receiving terminal, a short message sent from a short message service center (hereinafter referred to as a "SMSC"). Referring to FIG. 4, a method in the SMS originating and terminated control procedure for determining whether carriers have an SMS interconnection agreement with each other will be described.

When an originator enters text data to be sent as a short message and the telephone number of the receiving communication terminal 10 by operating an originating communication terminal 10 in the SMS originating control procedure, the originating communication terminal 10 generates and sends a short-message-mobile-originating (SM-MO) signal containing the entered text data and the telephone number of the receiving communication terminal 10 (Process P101).

The short-message-mobile-originating signal is sent to a (location-area) mobile switching center 200 that services the area in which the originating communication terminal 10 is currently located and that is operated and managed by the carrier to which the originating communication terminal 10 subscribes (hereinafter referred to as the "location-area MSC"). When receiving the short-message-mobile-originating signal, the location-area MSC 200 determines whether the carriers have an SMS interconnection agreement with each other (Process P102).

At this time, the location-area MSC 200 identifies the subscription carrier of a receiving communication terminal 10 from the telephone number of the receiving communication terminal 10 contained in the short-message-mobile-originating signal it has received to determine whether the carriers have an SMS interconnection agreement with each other. In particular, the location-area MSC 200 obtains the receiving communication terminal's 10 telephone number contained in the short-message-mobile-originating signal; the telephone number is a number in a system called the MSISDN (Mobile Station International Integrated Service Digital Network Number). An MSISDN contains a Country Code (CC) identifying a country and a Network Destination Code (NDC) identifying a carrier. The location-area MSC 200 determines from the CC and NDC in the MSISDN the carrier to which the receiving communication terminal 10 subscribes. The location-area MSC 200 then determines whether the carrier to which the receiving communication terminal 10 subscribes has an interconnection agreement with the carrier of the network on which the location-area MSC locates, from information in the SMS interconnection agreement participating carriers held by the location-area MSC 200.

If the location-area MSC 200 determines that the carriers have SMS interconnection agreement with each other, the location-area MSC 200 transfers the short-message-mobile-originating signal to the SMSC 40 (Process P103); otherwise, it does not transfer the short-message-mobile-originating signal.

When the SMSC 40 receives the short-message-mobile-originating signal, the SMSC 40 returns an SM-MO acknowledgement to the location-area MS C200 (Process P104), which in turn transfers the SM-MO acknowledgement to the originating communication terminal 10 (Process P105). Then, the SMS originating control procedure ends.

When receiving the SM-MO signal, the SMSC 40 performs the SMS terminated control procedure. In particular, the SMSC 40 transfers a short-message-mobile-terminated (SM-MT) signal to an MSC that is a gateway to another network (hereinafter referred to as a "gateway MSC") 500 (Process P106). When receiving the SM-MT signal, the gateway MSC 500 sends an SRIForSM (Send Routing Information for SM) signal (routing interrogation signal) to a Home Location Register (HLR) 30, which is a device that maintains subscriber information (Process P107) in order to interrogate about the location area information of the receiving communication terminal 10. The gateway MSC 500 receives an SRIForSMack (SRIForSM Acknowledgement) signal (routing acknowledgement signal) from the HLR 30 (Process P108), determines the routing to an MSC in the area in which the receiving communication terminal 10 is located, and transfers the SM-MT signal to the MSC (Process P109). The gateway MSC 500 receives an SM-MT acknowledgement from the MSC to which it has sent the SM-MT signal (Process P110), the gateway MSC 500 transfers the SM-MT acknowledgement to the SMSC 40 (Process P111). Then, the SMS terminated control procedure ends. It should be noted that in the SMS terminated control procedure, the originating network does not make determination as to an SMS interconnection agreement.

Japanese Patent Laid-Open No. 2001-16632 discloses a technology that transfers a short message to a receiving terminal that subscribes to a carrier that does not have an SMS interconnection agreement. This technology also requires determination as to whether there is an SMS interconnection agreement between the carrier of the originating terminal and the carrier of the receiving terminal. Thus, accurate determination as to whether carriers have an SMS interconnection agreement with each other is crucial in a short-message originating and terminated control procedure.

In recent years, number portability systems have been introduced. Number portability is a system that enables communication terminal users to switch from one carrier to another while retaining their existing telephone number for sending and receiving messages.

If a receiving terminal has used number portability to switch to another carrier (hereinafter referred to as "using number portability") and an originating terminal sends a short message to the receiving terminal, the following problem arises.

If the carrier of the originating terminal does not have an SMS interconnection agreement with the carrier to which a receiving terminal using number portability subscribes but has an SMS interconnection agreement with the carrier to which the receiving terminal subscribed before using number portability, a location-area MSC will erroneously determine in the SMS originating control procedure that the current carriers of the originating and receiving terminals have an SMS interconnection agreement with each other. However, a short message is not delivered to the receiving terminal but yet the originating terminal may be billed for the message. This erroneous determination is made because the telephone number of the receiving terminal is the same as the one used before using number portability and therefore the location-area MSC determines whether the carrier to which the receiving terminal subscribed before using number portability has a SMS interconnection agreement with the carrier of the originating terminal.

On the other hand, if the carrier of the originating terminal has an SMS interconnection agreement with the carrier to which a receiving terminal using number portability subscribes but does not have an SMS interconnection agreement with the carrier to which the receiving terminal subscribed before using number portability, the location-area MSC will determine erroneously in the SMS originating control procedure that the carriers do not have an SMS interconnection agreement with each other and therefore does not transfer a SM-MO signal to the short message center. Consequently, the originating terminal cannot send a short message to the receiving terminal. The same reason described above applies to this erroneous determination. As just described, there have been problems due to such erroneous determination, such as a short message not being sent to an intended receiving terminal or a short message not to be transferred to a receiving terminal being sent to a short message service center and the originating terminal is falsely billed for the message.

SUMMARY OF THE INVENTION

The present invention has been made in light of the problems described above, and an object of the present invention is to provide an interconnection agreement determining system, apparatus, and method that can make proper determination as to whether the carrier to which an originating communication terminal subscribes and the carrier to which a receiving communication terminal subscribes have a short message interconnection agreement with each other, even if the receiving communication terminal uses number portability.

To solve the problems described above, the present invention according to claim 1 provides an interconnection agreement determining system compatible with number portability, the number portability allowing a telephone number inputted on an originating communication terminal to call a receiving communication terminal to be kept unchanged when the receiving communication terminal changes the carrier to which the receiving communication terminal subscribes, wherein: when a location-area mobile switching center servicing the area in which the originating communication terminal is currently located receives from the originating communication terminal a short message originating signal for requesting the transfer of a short message to the receiving communication terminal, the location-area mobile switching center identifies the carrier to which the receiving communication terminal subscribes; and the location-area mobile switching center transfers the short message originating signal to a short message center which stores and relays a short message, only if the location-area mobile switching center determines that the identified carrier and the carrier to which the originating communication terminal subscribes have a short message service interconnection agreement with each other; the location-area mobile switching center including: interrogating means which, when receiving the short message originating signal, sends a routing interrogation signal including the telephone number of the receiving communication terminal to a subscriber information managing device which manages subscriber identification information identifying the receiving communication terminal and being changed if the receiving communication terminal changes the carrier to which the receiving communication terminal subscribes in association with telephone number of the receiving communication terminal; subscriber-identification-information obtaining means for obtaining subscriber identification information contained in a routing acknowledgement signal received from the subscriber information managing device in response to the routing interrogation signal sent by the interrogating means; and on-origination carrier identifying means for identifying the carrier to which the receiving communication terminal subscribes, on the basis of the subscriber identification information obtained by the subscriber-identification-information obtaining means; and the location-area mobile switching center determines, on the basis of the identification made by the on-origination carrier identifying means, whether the carriers have a short message service interconnection agreement with each other.

According to the present invention set forth in claim 1, the location-area mobile switching center identifies the carrier to which the receiving communication terminal subscribes, on the basis of the subscriber identification information contained in the routing acknowledgement signal received from the subscriber information managing device. When the communication terminal switches from one carrier to another by using number portability, the subscriber identification information herein is changed accordingly, therefore the location-area mobile switching center can accurately identify the carrier to which the receiving communication terminal currently subscribes on the basis of the subscriber identification information even though the telephone number of the receiving communication terminal is kept unchanged by virtue of number portability. Therefore, on the basis of the proper identification of the carrier, the local-area mobile switching center can accurately determine whether the carriers have a short message service interconnection agreement with each other.

This can avoid the problem that a short message is not delivered to a receiving communication terminal even though the carrier to which the originating communication terminal subscribes and the carrier to which the receiving communication terminal have a short message service interconnection agreement with each other, or the problem that a short message originating signal is transferred to a short message center and the originating communication terminal is billed even though the carriers do not have a short message service interconnection agreement. Thus, the interconnection agreement determining system allows a short message to be transferred accurately in accordance with a short message service interconnection agreement.

The present invention set forth in claim 2 provides the interconnection agreement determining system according to claim 1, further including a gateway mobile switching center including an on-reception carrier identifying means which, when receiving a short message reception signal containing the telephone number of the receiving communication terminal from the short message center, identifies the carrier to which the receiving communication terminal subscribes, on the basis of subscriber identification information contained in a routing acknowledgement signal received in response to a routing interrogation signal sent to the subscriber information managing device; wherein the gateway mobile switching center transfers the short message reception signal to a location-area mobile switching center that services the area in which the receiving communication terminal is currently located, only if the gateway mobile switching center determines that the carrier identified by the on-reception carrier identifying means as the carrier to which the receiving communication terminal subscribes and the carrier to which the originating communication terminal subscribes have a short message service interconnection agreement with each other.

According to the present invention set forth in claim 2, the interconnection agreement determining system further includes the gateway mobile switching center which determines whether carriers have a short message service interconnection agreement with each other. Thus, determination as to whether the carriers have a short message service interconnection agreement can be made by both the location-area mobile switching center and the gateway mobile switching center. If subscriber identification information obtained by the gateway mobile switching center in the SMS terminated control procedure differs from the subscriber identification information obtained by the location-area mobile switching center in the SMS originating control procedure, the interconnection agreement determining system can make proper determination based on the latest subscriber identification information obtained by the gateway mobile switching center. Because the determination is made twice in this way, the accuracy can be improved.

The present invention set forth in claim 3 provides an interconnection agreement determining apparatus compatible with number portability, the number portability allowing a telephone number inputted on an originating communication terminal to call a receiving communication terminal to be kept unchanged when the receiving communication terminal changes the carrier to which the receiving communication terminal subscribes, wherein:

the carrier to which the receiving communication terminal subscribes is identified, and determination is made as to whether the identified carrier and the carrier to which the originating communication terminal subscribes have a short message service interconnection agreement with each other; the interconnection agreement determining apparatus including: interrogating means which sends a routing interrogation signal including the telephone number of the receiving communication terminal, when receiving a short message signal sent from the originating communication terminal for requesting the transfer of a short message to the receiving communication terminal; subscriber-identification-information obtaining means for obtaining subscriber identification information contained in a routing acknowledgement signal received in response to the routing interrogation signal sent by the interrogating means, the subscriber identification information identifying the receiving communication terminal and being changed when the receiving communication terminal changes the carrier to which the receiving communication terminal subscribes; and carrier identifying means for identifying the carrier to which the receiving communication terminal subscribes, on the basis of the subscriber identification information obtained by the subscriber-identification-information obtaining means; and the interconnection agreement determining apparatus determines on the basis of the identification made by the carrier identifying means whether the carriers have the short message service interconnection agreement with each other.

According to the present invention set forth in claim 3, the interconnection agreement determining apparatus identifies the carrier to which a receiving communication terminal subscribes, from the subscriber identification information contained in the routing acknowledgement signal. The subscriber identification information herein identifies the receiving communication terminal and is changed when the receiving communication terminal switches from one carrier to another. Thus, the interconnection agreement determining apparatus can accurately identify the carrier to which the receiving communication terminal currently subscribes even if the telephone number of the receiving communication terminal is kept unchanged by virtue of number portability when the receiving communication terminal changes its carrier. Furthermore, on the basis of the proper identification of the carrier, the interconnection agreement determining apparatus can accurately determine whether the carriers have a short message service interconnection agreement with each other. Therefore, the interconnection agreement determining apparatus can transfer a short message according to the short message service interconnection agreement determined accurately. Thus, the problems that would be caused by erroneous determination can be avoided.

The interconnection agreement determining apparatus may be a location-area mobile switching center, a gateway mobile switching center, or other switching devices. In the SMS originating and terminated control procedure, at least one of the devices determines whether carriers have a short message interconnection agreement with each other. Thus, accurate determination can be made and proper processing based on the accurate determination can be performed. The accuracy of the determination can be further improved if more than one device make the determination.

The present invention set forth in claim 4 is the interconnection agreement determining apparatus according to claim 3, wherein the received short message signal is transferred to the receiving communication terminal only if determination is made, on the basis of the identification made by the carrier identifying means, that the carriers have a short message service interconnection agreement with each other.

According to the present invention set forth in claim 4, the interconnection agreement determining apparatus transfers a short message signal to the receiving communication terminal only if it determines that the carriers have a short message service interconnection agreement with each other. Accordingly, the short message is transferred only to the receiving communication terminal that subscribes to a carrier with which the originating communication terminal's carrier has a short message service interconnection agreement. Thus the interconnection agreement determining apparatus can avoid the problem that a short message is transferred to a receiving communication terminal that subscribes to a carrier with which an originating terminal's carrier does not have a short message service interconnection agreement and the originating communication terminal is billed for the message, or the problem that a short message is not transferred to a receiving communication terminal that subscribes to a carrier with which the originating communication terminal's carrier has an interconnection agreement.

The present invention according to claim 5 provides an interconnection agreement determining method compatible with number portability, the number portability allowing a telephone number inputted on an originating communication terminal to call a receiving communication terminal to be kept unchanged when the receiving communication terminal changes the carrier to which the receiving communication terminal subscribes, wherein an interconnection agreement determining apparatus identifies the carrier to which the receiving communication terminal subscribes, and determines whether the identified carrier and the carrier to which the originating communication terminal subscribes have a short message service interconnection agreement with each other; the interconnection agreement determining method including: an interrogating step of sending by the interconnection agreement determining apparatus a routing interrogation signal including the telephone number of the receiving communication terminal when receiving a short message signal sent from the originating communication terminal for requesting the transfer of a short message to the receiving communication terminal; a subscriber-identification-information obtaining step of obtaining, by the interconnection agreement determining apparatus, subscriber identification information contained in a routing acknowledgement signal received in response to the routing interrogation signal sent in the interrogating step, the subscriber identification information identifying the receiving communication terminal and being changed when the receiving communication terminal changes the carrier to which the receiving communication terminal subscribes; and a carrier identifying step of identifying by the interconnection agreement determining apparatus the carrier to which the receiving communication terminal subscribes, on the basis of the subscriber identification information obtained in the subscriber-identification-information obtaining step; and the interconnection agreement determining apparatus determines on the basis of the identification made in the carrier identifying step whether the carriers have the short message service interconnection agreement with each other.

The present invention according to claim 5 has the same effects and advantages as those of the present invention according to claim 3.

According to the present invention, the carrier to which a receiving communication terminal subscribes is determined from subscriber identification information contained in a routing acknowledge signal. The subscriber identification information identifies the receiving communication terminal and is changed when the communication terminal switches from one carrier to another. Therefore, the carrier to which the receiving communication terminal currently subscribes can be determined accurately even if the telephone number of the receiving communication terminal is kept unchanged by virtue of number portability when the terminal changes the carrier.

Consequently, accurate determination as to a short message service interconnection agreement can be made based on the accurate identification of the carrier of the communication terminal and a short message can be transferred based on the accurate determination.

The apparatus that determines whether carriers have a short message service interconnection agreement with each other may be a location-area MSC, a gateway MSC, or other switching devices and accurate determination as to a short message service interconnection agreement can be made in the SMS originating and terminated control procedure by identifying in at least one such device the carrier to which a receiving communication terminal subscribes.

DETAILED DESCRIPTION OF THE PREFERRED EMBODIMENTS

The best mode for implementing the present invention will be described below with reference to the accompanying drawings. Throughout the drawings referred to in the following description, like reference numerals indicate like elements.

(1. Configuration)

(1.1 Overall configuration)

Figure 1:
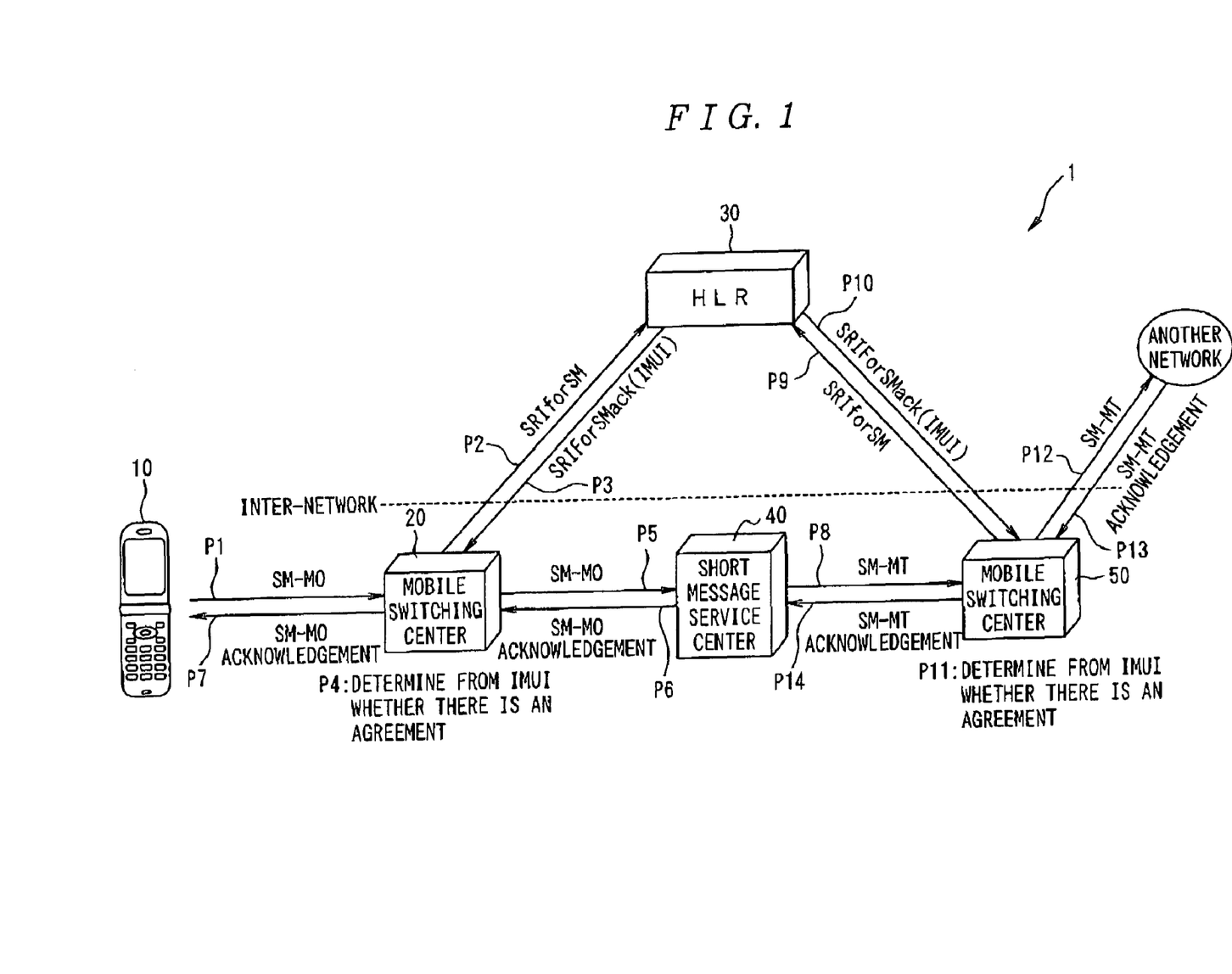
FIG. 1 is a block diagram showing a configuration of an SMS interconnection agreement determining system according to an embodiment of the present invention.

FIG. 1 is a block diagram showing a configuration of an entire SMS interconnection agreement determining system 1 according to the present embodiment. The SMS interconnection agreement determining system 1 is a third-generation mobile communication network conforming to the 3GPP (3rd Generation Partnership Project) standard. As shown in FIG. 1, the SMS interconnection agreement determining system 1 includes a communication terminals 10, a mobile switching center (hereinafter referred to as a "location-area MSC") 20, which services the area in which the communication terminal 10 is currently located, a home location register (hereinafter referred to as an "HLR") 30, which manages subscriber information and location area information of communication terminals 10, a short message service center (SMSC) 40, which transfers and stores short messages, a gateway mobile switching center (hereinafter referred to as a "gateway MSC") 50, which performs reception processing and controls connection to another network, and a communication network which connects these devices.

While only one device in each group of device types 10 to 50 is shown in FIG. 1, there is more than one such device in practice. In the following description, the same reference numeral is used for communication terminals 10 unless it is necessary to distinguish them from one another. The same applies to the location-area MSCs 20, HLRs 30, SMSCs 40, and gateway MSCs 50.

The communication terminal 10 is a conventional mobile communication terminal conforming to the 3GPP standard. A UIM (User Identify Module) is attached to the communication terminal 10. A UIM is an IC (Integrated Circuit) card on which information about a subscriber to a mobile communication service is stored. Stored in a memory of the UIM are an MSISDN (Mobile Station International Integrated Service Digital Network Number) and an IMUI (International Mobile User Identifier).

An MSISDN is a "telephone number" which is entered by an originator by operating operation buttons on a communication terminal 10 when calling another communication terminal 10. The MSISDN stored in a UIM is retained when the communication terminal 10 uses number portability. Accordingly, an originating communication terminal 10 can reach a communication terminal 10 that used number portability, by using the same telephone number used before the communication terminal 10 used the number portability.

An IMUI is the identifier of a subscriber in a mobile communication network and is used in calling or registering the location of a communication terminal 10. An IMUI includes an MCC (Mobile Country Code), which identifies a country, an MNC (Mobile Network Code), which identifies a carrier, and an MSIN (Mobile Subscriber Identification Number), which identifies a subscriber. When a communication terminal 10 uses number portability, the IMUI stored in its UIM is changed to the number associated with the new carrier. Therefore, the carrier of the communication terminal 10 is identified accurately by the MCC and MNC of the IMUI.

It is assumed here that each communication terminal 10 subscribes to a short message service.

An originating communication terminal 10 sends a short-message-service-originating signal (hereinafter referred to as an "SMS originating signal") to a receiving communication terminal 10 in an SMS originating control procedure. The SMS originating signal includes the MSISDN of the receiving communication terminal 10 which is entered on the originating communication terminal 10 and text data to be sent to the receiving communication terminal 10 as a short message.

The HLR 30 is a conventional device and includes a database for managing the subscriber information and location area information of communication terminals 10. The subscriber information includes MSISDNs, IMUIs, and service information indicating whether each communication terminal subscribes to a service such as a short message service.

When the HLR 30 receives an attach request from a communication terminal 10 through a location-area MSC 20, the HLR 30 sends subscriber information of the communication terminal 10 maintained in the database to the location-area MSC 20. The HLR 30 also manages address information of the location-area MSC 20, which it received through the attach request, in the database as the location area information of the communication terminal 10.

When the HLR 30 receives an SRIforSM (Send Routing Information for Short Message) signal (routing interrogation signal), the HLR 30 obtains the corresponding IMUI from the database on the basis of the MSISDN contained in the SRIforSM signal. The HLR 30 also obtains address information of the location-area MSC 20 that services the communication terminal 10 identified by the MSISDN from the database and interrogates the location-area MSC 20 to check whether the location-area MSC 20 services the communication terminal 10. Then, the HLR 30 generates an SRIforSMack (SRIforSM acknowledgement) signal (routing acknowledgement signal) containing the obtained IMUI and the address information of the location-area MSC 20 and returns the SRIforSMack signal to the device that has sent the SRIforSM.

The SMSC 40 is a conventional device which relays a short message transmitted from an originating communication terminal 10 to a receiving communication terminal 10 and temporarily stores a short message that cannot be transferred to a receiving communication terminal 10 in an SMS terminated control procedure.

(1.2 Location-area MSC)

The location-area MSC 20 will be described below. The location-area MSC 20 controls wireless communications performed by communication terminals 10 located within the wireless communication service area of the location-area MSC 20. The location-area MSC 20 is a conventional server which includes as hardware components a CPU (Central Processing Unit) which controls the entire location-area MSC 20, a storage including a ROM (Read Only Memory), a RAM (Random Access Memory), and a hard disk, and a communication interface, which controls data communications with external devices through a communication network.

The storage of the location-area MSC 20 stores various types of software. For example, the storage of the location-area MSC 20 stores SMS interconnection agreement participating carrier information used for determining whether the carrier of the network on which the location-area MSC 20 exists and the carrier to which a receiving communication terminal 10 subscribes have an SMS interconnection agreement with each other. Also provided in the storage of the location-area MSC 20 is a VLR (Visitor Location Register), which is a database for storing subscriber information of the communication terminals 10 within the service area. Stored in the VLR is subscriber information of communication terminals 10 downloaded from the HLR 30 when sending an attach request.

Programs stored in the storage of the location-area MSC 20 include programs for implementing conventional functions of the location-area MSC 20 as well as programs unique to the present invention, such as a program for sending an SRIforSM signal in response to an SMS originating signal and a program for identifying a carrier from an IMUI.

Figure 2:
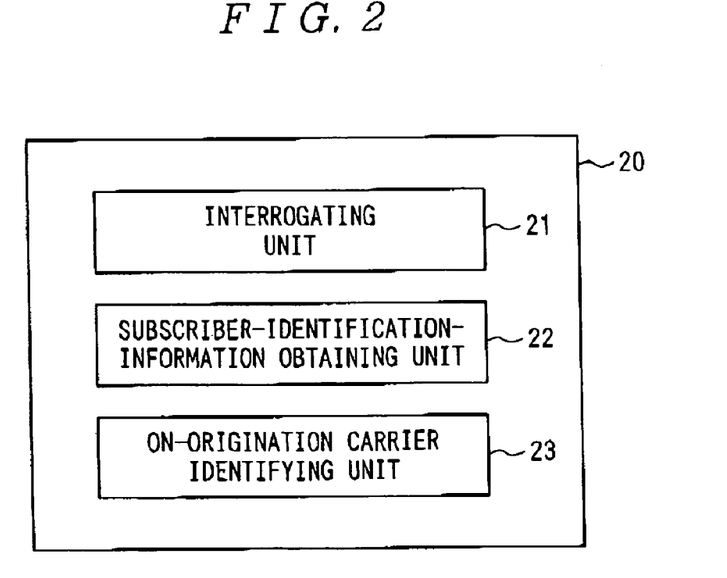
FIG. 2 is a block diagram showing a functional configuration of a location-area MSC according to the embodiment.

The CPU of the location-area MSC 20 reads these programs from the storage and executes them to implement function units shown in FIG. 2 on the location-area MSC 20. The function units shown in FIG. 2 will be described below.

When receiving an SMS originating signal from an originating communication terminal 10, the interrogating unit 21 obtains the MSISDN of a receiving communication terminal 10 from the received SMS originating signal. The interrogating unit 21 determines on the basis of the obtained MSISDN the HLR 30 that manages subscriber information of the receiving communication terminal 10. The interrogating unit 21 generates an SRIforSM signal containing the MSISDN of the receiving communication terminal 10. Then, the interrogating unit 21 sends the generated SRIforSM to the HLR 30 that manages the subscriber information of the receiving communication terminal 10 through a communication interface. The SRIforSM is a conventional signal sent for interrogating about the location area information of a receiving communication terminal 10.

When receiving an SRIforSMack from an HLR 30 in response to an SRIforSM sent by the interrogating unit 21, the subscriber-identification-information obtaining unit 22 obtains the IMUI from the SRIforSMack.

The on-origination carrier identifying unit 23 identifies the carrier to which a receiving communication terminal 10 subscribes, from the MCC and MNC contained in an IMUI obtained by the subscriber-identification-information obtaining unit 22.

The location-area MSC 20 also has the following conventional capabilities. When receiving an SMS originating signal from an originating communication terminal 10, the location-area MSC 20 obtains service information of the originating communication terminal 10 from the VLR. The location-area MSC 20 determines on the basis of the obtained service information whether the originating communication terminal 10 subscribes to a short message service and whether an SMS originating signal should be sent or not.

Furthermore, the location-area MSC 20 determines, on the basis of the SMS interconnection agreement participating carrier, whether the carrier identified by the on-origination carrier identifying unit 23 as the carrier to which the receiving communication terminal 10 subscribes has an SMS interconnection agreement with the carrier to which the originating communication terminal 10 subscribes. If the location-area MSC 20 determines that the carriers have an SMS interconnection agreement with each other, then the location-area MSC 20 transfers the SMS originating signal it has received to the SMSC 40.

When the location-area MSC 20 receives a short message service reception signal (hereinafter referred to as an "SMS reception signal") transferred from the SMSC 40 in an SMS terminated control procedure, the location-area MSC 20 transfers the SMS reception signal to the receiving communication terminal 10.

(1.3 Gateway MSC)

The gateway MSC 50 will be described below. The gateway MSC 50 has a hardware configuration of a typical server similarly to the case of the local-area MSC 20. The storage of the gateway MSC 50 stores programs for implementing conventional functions of the gateway MSC 50 as well as a program for determining whether carriers have an SMS interconnection agreement and data such as SMS interconnection agreement participating carrier that are unique to the present invention.

Figure 3:
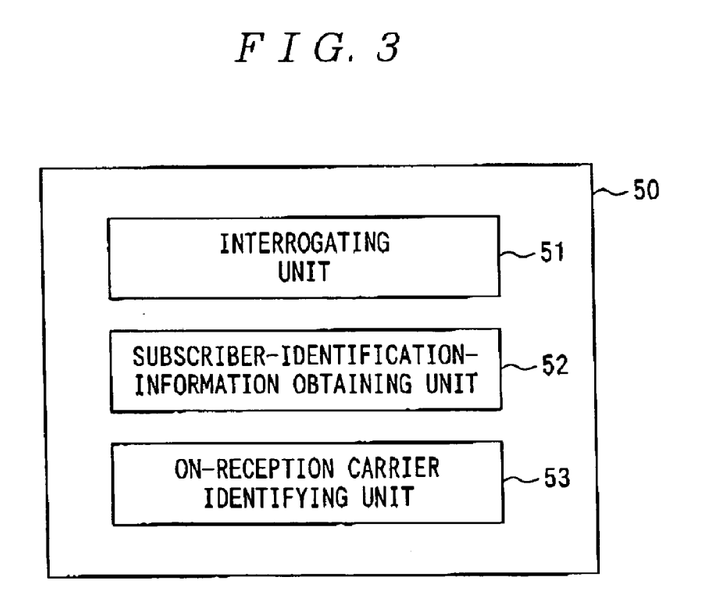
FIG. 3 is a block diagram showing a functional configuration of a gateway MSC according to the embodiment.

The CPU of the gateway MSC 50 reads programs stored in the storage and executes them to implement function units shown in FIG. 3. The function units shown in FIG. 3 will be described below.

The interrogating unit 51 is a conventional function unit of the gateway MSC 50 and has a function substantially similar to that of the interrogating unit 21 of the location-area MSC 20. In particular, when the interrogating unit 51 receives an SMS reception signal from the SMSC 40, the interrogating unit 51 obtains the MSISDN of the receiving communication terminal 10 contained in the SMS originating signal. The interrogating unit 51 identifies from the obtained MSISDN the HLR 30 that manages subscriber information of the receiving communication terminal 10. The interrogating unit 51 generates an SRIforSM signal including that MSISDN. Then the interrogating unit 51 sends through the communication interface the generated SRIforSM to the HLR 30 that manages the subscriber information of the receiving communication terminal 10.

The subscriber-identification-information obtaining unit 52 represents a function unique to the present invention. When receiving an SRIforSMack from an HLR 30 as an acknowledgement of the SRIforSM, the subscriber-identification-information obtaining unit 52 obtains the IMUI contained in the SRIforSMack.

The on-reception carrier identifying unit 53, which represents a function unique to the present invention, identifies the carrier to which a receiving communication terminal 10 subscribes, on the basis of the MCC and MNC contained in an IMUI obtained by the subscriber-identification-information obtaining unit 22.

Another function unique to the present invention is that the gateway MSC 50 determines on the basis of the SMS interconnection agreement participating carrier information whether the carrier of a receiving communication terminal 10 which is identified by the on-reception carrier identifying unit 53 has an SMS interconnection agreement with the carrier to which an originating communication terminal 10 subscribes and which is the carrier of the network to which the gateway MSC 50 belongs. If the gateway MSC 50 determines that they have an SMS interconnection agreement, then the gateway MSC 50 transfers the received SMS originating signal to the location-area MSC 20 that services the receiving communication terminal 10.

A conventional function of the gateway MSC 50 is that it determines the routing to the location-area MSC 20 that services a receiving communication terminal 10 on the basis of the address information of the location-area MSC 20 contained in the SRIforSMack.

(2. Operation)

Operations in SMS originating and terminated control procedure performed in the configuration described above will be described below with reference to FIG. 1. In the following description, a communication terminal 10 that sends a short message is designated as originating terminal 10a and a communication terminal 10 that receives the short message is designated as receiving terminal 10b. It is assumed here that the originating terminal 10a and the receiving terminal 10b subscribe to different carriers. It is also assumed that the location-area MSC 20, the SMSC 40, and the gateway MSC 50 shown in FIG. 1 are operated by the carrier to which the originating terminal 10a subscribes.

(2.1. SMS Originating (SM-MO) Control Procedure)

The SMS originating (SM-MO) control procedure will be described first.

An originator enters text data to be sent as a short message by operating the originating terminal 10a. The originator then enters the telephone number (MSISDN) of the receiving terminal 10b and instructs the originating terminal 10a to send the message.

This causes the originating terminal 10a to generate an SMS originating (SM-MO) signal for requesting the transmission of the short message directed to the receiving terminal 10b. In particular, the originating terminal 10a reads subscriber information from a UIM attached to the originating terminal 10a. Then the originating terminal 10a generates an SMS originating signal including the read subscriber information and the MSISDN of the receiving terminal 10b and sends the generated SMS originating signal (Process P1).

The SMS originating signal sent from the originating terminal 10a is transferred to a location-area MSC 20 operated by the carrier to which the originating terminal 10a subscribes. The location-area MSC 20 receives the SMS originating signal and reads subscriber information of the originating terminal 10a stored in its VLR and checks whether the originating terminal 10a subscribes to the short message service.

According to the conventional art, the location-area MSC 20 would then make determination on the basis of the MSISDN included in the SMS originating signal as to whether carriers have an SMS interconnection agreement. According to the present invention, the location-area MSC 20 does not do so. Instead, the interrogating unit 21 of the location-area MSC 20 identifies from the MSISDN the HLR 30 that manages subscriber information of the receiving terminal 10b. The interrogating unit 21 generates an SRIForSM signal including the MSISDN of the receiving terminal 10b. Then the interrogating unit 21 sends the generated SRIForSM to the HLR 30 (Process P2).

When receiving the SRIForSM, the HLR 30 obtains the IMUI associated with the MSISDN from a database on the basis of the MSISDN of the receiving terminal 10b included in the SRIForSM in a conventional manner. The HLR 30 also obtains, from the database, address information of the location-area MSC of the area where the receiving terminal 10b is located. Then, the HLR 30 returns an SRIForSMack containing the IMUI and the address information of the location-area MSC of the area where the receiving terminal 10b is located to the location-area MSC 20 (Process P3).

When the location-area MSC 20 receives the SRIForSMack from the HLR 30, the subscriber-identification-information obtaining unit 22 obtains the IMUI of the receiving terminal 10b from the SRIForSMack.

The on-origination carrier identifying unit 23 identifies the carrier to which the receiving terminal 10b subscribes, from the MCC and MNS included in the IMUI of the receiving terminal 10b.

Then, the location-area MSC 20 determines from information on a SMS interconnection agreement participating carrier in a conventional manner whether the carrier to which the receiving terminal 10b subscribes has an SMS interconnection agreement with the carrier to which the originating terminal 10a subscribes, which is also the carrier of the network to which the location-area MSC 20 belongs (Process P4).

If it is determined that there is an SMS interconnection agreement between them, the location-area MSC 20 transfers the SMS originating signal to the SMSC 40 (Process P5).

When the SMSC 40 receives the SMS originating signal, the SMSC 40 sends an SM-MO acknowledgement to the location-area MSC 20 (Process P6), which in turn transfers the SM-MO acknowledgement to the originating terminal 10 (Process P7). Then, the SMS originating control procedure ends.

(2.2. SMS Terminated (SM-MT) Control Procedure)

The SMS terminated (SM-MT) control procedure will be described below.

In the SMS terminated control procedure, the SMSC 40 generates an SMS terminated (SM-MT) signal including the MSISDN of a receiving terminal 10b and sends the generated SMS terminated signal to the gateway MSC 50 (Process P8).

The gateway MSC 50 receives the SMS reception signal and generates an SRIForSM including the MSISDN contained in the SMS reception signal in a conventional manner. The interrogating unit 51 sends the SRIForSM to the HLR 30 that manages subscriber information of the receiving terminal 10b (Process P9).

When receiving the SRIForSM, the HLR 30 generates an SRIForSMack in a conventional manner, which has been described in section "2.1 SMS originating control procedure", and returns it to the gateway MSC 50 (Process P10).

When the gateway MSC 50 receives the SRIForSMack from the HLR 30, the gateway MSC 50 determines, in a conventional manner, the routing to the location-area MSC 20 on the basis of the address information of the location-area MSC 20 that services the area where the receiving terminal 10b is located, which is contained in the SRIForSMack.

In the present procedure, in contrast to the conventional procedure, the subscriber-identification-information obtaining unit 52 obtains the IMUI from the received SRIForSMack. The on-reception carrier identifying unit 53 identifies the carrier to which the receiving terminal 10b subscribes, on the basis of the MCC and MNS included in the IMUI of the receiving terminal 10b obtained by the subscriber-identification-information obtaining unit 52. Then, the gateway MSC 50 determines, on the basis of the identification made by the on-reception carrier identifying unit 53, whether the carriers have an SMS interconnection agreement with each other (Process P11).

If the gateway MSC 50 determines that they have an SMS interconnection agreement, then the gateway MSC 50 transfers the SMS reception signal to a location-area MSC 20 of another network in which the receiving terminal 10b is located (Process P12). When the gateway MSC 50 receives an SM-MT acknowledgement from the location-area MSC 20 of another network (Process P13), the gateway MSC 50 transfers the SM-MT acknowledgement to the SMSC 40 (Process P14). Then, the SMS terminated control procedure ends.

In this way, the SMS interconnection agreement determination is made in the SMS terminated control procedure as well as in the SMS originating control procedure and, if the receiving terminal 10b changes its subscription carrier after determination is made in the SMS originating control procedure that the carrier has an SMS interconnection agreement with the originating terminal's carrier, it is determined in the SMS terminated control procedure that the carriers do not have an SMS interconnection agreement. Thus, determination as to whether the carriers have an SMS interconnection agreement with each other can be made with an enhanced accuracy on the basis of the latest IMUI information.

As has been described, according to the present invention, the location-area MSC 20 sends the SRIForSM signal to the HLR 30 and receives an SRIForSMack signal as the acknowledgement of it to obtain the IMUI of a receiving terminal 10b and uses the IMUI to determine whether the carriers have an SMS interconnection agreement with each other in the SMS originating and terminated control procedure of mobile communication networks. Thus, the receiving terminal's 10b subscription carrier can be accurately identified and therefore the SMS interconnection agreement determination can be made accurately. Thus, it is possible to accurately identify the carrier to which a receiving terminal 10b subscribes and determine properly whether the carrier has an SMS interconnection agreement, even if the receiving terminal 10b uses number portability.

Furthermore, because the present invention can be implemented with signals (SRIForSM and SRIForSMack) that have been conventionally used, no additional facilities to the HLR 30 or hardware enhancements are required. In addition, because there is no need to add facilities to communication terminals 10 or SMSCs 40, the present invention can be implemented at low costs.

Furthermore, SMS interconnection agreement determination is made by a gateway MSC 50 in the SMS terminated control procedure as well, determination as to whether carriers have an SMS interconnection agreement with each other can be made accurately even if information in the IMUI obtained in the SMS terminated control procedure differs from information in the IMUI obtained in the SMS originating control procedure or if determination as to whether the carriers have an SMS interconnection agreement is not made in the SMS originating control procedure.

While the SMS interconnection agreement determining system 1 in the embodiment described above is a mobile communication network that conforms to the 3GPP, the network is not limited to such a network. Any networks that allow communication terminals 10 having information equivalent to telephone numbers (MSISDN) and information equivalent to subscriber information (IMUI) to send and receive short messages can be used. For example, the network may be a next-generation communication network or a 2 G (second-generation) mobile communication network. Data transmitted as a short message is not limited to text data. The data may be image data, for example.

While a location-area MSC 20 and a gateway MSC 50 make determination as to an SMS interconnection in the SMS originating and terminated control procedure agreement in the embodiment described above, the present invention is not so limited. The determination may be made by one of these devices, or other devices such as a SMSC 40.

While determination as to an SMS interconnection agreement is made on the basis of information on an SMS interconnection agreement participating carrier in the embodiment described above, the determination method is not so limited. For example, the determination may be made by a program.

While the existing signals are used to obtain an IMUI in the embodiment described above, the present invention is not so limited. New signals may be used for obtaining the IMUI.

The present invention can be used in application areas in which number portability should be addressed or application areas in which a carrier is identified or determination as to whether parties have an interconnection agreement with each other is required.

What is claimed is:

1. An interconnection agreement determining system compatible with number portability, said number portability allowing a telephone number inputted on an originating communication terminal to call a receiving communication terminal to be kept unchanged when said receiving communication terminal changes the carrier to which said receiving communication terminal subscribes, wherein:

when a first switching center servicing the area in which said originating communication terminal is currently located receives from said originating communication terminal a short message originating signal for requesting the transfer of a short message to said receiving communication terminal, the first switching center identifies the carrier to which said receiving communication terminal subscribes; and said first switching center transfers said short message originating signal to a short message service center which stores and relays a short message, only if said first switching center determines that the identified carrier and the carrier to which said originating communication terminal subscribes have a short message service interconnection agreement with each other;

said first switching center comprising:

interrogating means which, when receiving said short message originating signal, sends a routing interrogation signal including the telephone number of said receiving communication terminal to a subscriber information managing device which manages subscriber identification information identifying said receiving communication terminal and being changed if said receiving communication terminal changes the carrier to which said receiving communication terminal subscribes in association with telephone number of said receiving communication terminal;

subscriber-identification-information obtaining means for obtaining subscriber identification information contained in a routing acknowledgement signal received from said subscriber information managing device in response to the routing interrogation signal sent by said interrogating means;

on-origination carrier identifying means for identifying the carrier to which said receiving communication terminal subscribes, on the basis of the subscriber identification information obtained by said subscriber-identification-information obtaining means; and a storage means for storing short message service interconnection agreement participating carrier information used for determining whether the carrier of the network on which the first switching center exists and the carrier to which a receiving communication terminal subscribes have an interconnection agreement with each other;

said first switching center determines, on the basis of the identification made by said on-origination carrier identifying means, whether the carriers have a short message service interconnection agreement with each other; and further comprising a second switching center including an on-reception carrier identifying means which, when receiving a short message reception signal containing the telephone number of said receiving communication terminal from said short message service center, identifies the carrier to which said receiving communication terminal subscribes, on the basis of subscriber identification information contained in a routing acknowledgment signal received in response to a routine interrogation signal sent to said subscriber information managing device;

wherein said second switching center transfers said short message reception signal to a first switching center that services the area in which said receiving communication terminal is currently located, only if said second switching center determines that the carrier identified by said on-reception carrier identifying means as the carrier to which said receiving communication terminal subscribes and the carrier to which said originating communication terminal subscribes have a short message service interconnection agreement with each other.

2. An interconnection agreement determining apparatus compatible with number portability, said number portability allowing a telephone number inputted on an originating communication terminal to call a receiving communication terminal to be kept unchanged when said receiving communication terminal changes the carrier to which said receiving communication terminal subscribes, wherein:

the carrier to which said receiving communication terminal subscribes is identified, and determination is made as to whether said identified carrier and the carrier to which said originating communication terminal subscribes have a short message service interconnection agreement with each other;

said interconnection agreement determining apparatus comprising a first switching apparatus which includes:

interrogating means which sends a routing interrogation signal including the telephone number of said receiving communication terminal, when receiving a short message signal sent from said originating communication terminal or requesting the transfer of a short message to said receiving communication terminal;

subscriber-identification-information obtaining means for obtaining subscriber identification information contained in a routing acknowledgement signal received in response to the routing interrogation signal sent by said interrogating means, said subscriber identification information identifying said receiving communication terminal and being changed when said receiving communication terminal changes the carrier to which said receiving communication terminal subscribes;

carrier identifying means for identifying the carrier to which said receiving communication terminal subscribes, on the basis of the subscriber identification information obtained by said subscriber-identification-information obtaining means; and a storage means for storing short message service interconnection agreement participating carrier information used for determining whether the carrier of the network on which the first switching apparatus exists and the carrier to which a receiving communication terminal subscribes have an interconnection agreement with each other; and said interconnection agreement determining apparatus determines on the basis of the identification made by said carrier identifying means whether said carriers have said short message service interconnection agreement with each other; and said received short message signal is transferred to said receiving communication terminal only if determination is made, on the basis of the identification made by said carrier identifying means, that the carriers have a short message service interconnection agreement with each other; and further comprising a second switching apparatus which includes an on-reception carrier identifying means which, when receiving a short message reception signal containing the telephone number of said receiving communication terminal, identifies the carrier to which said receiving communication terminal subscribes on the basis of subscriber identification information contained in a routing acknowledgment signal received in response to a routing interrogation signal sent by said second switching apparatus, wherein said short message reception signal is transferred to a first switching apparatus that services the area in which said receiving communication terminal is currently located, only if said second switching apparatus determines that the carrier identified by said on-reception carrier identifying means as the carrier to which said receiving communication terminal subscribes and the carrier to which said originating communication terminal subscribes have a short message service interconnection agreement with each other.

3. An interconnection agreement determining method compatible with number portability, said number portability allowing a telephone number inputted on an originating communication terminal to call a receiving communication terminal to be kept unchanged when said receiving communication terminal changes the carrier to which said receiving communication terminal subscribes, wherein an interconnection agreement determining apparatus identifies the carrier to which said receiving communication terminal subscribes, and determines whether said identified carrier and the carrier to which said originating communication terminal subscribes have a short message service interconnection agreement with each other;

said interconnection agreement determining method comprising:

an interrogating step of sending by said interconnection agreement determining apparatus a routing interrogation signal including the telephone number of said receiving communication terminal when receiving a short message signal sent from said originating communication terminal for requesting the transfer of a short message to said receiving communication terminal;

a subscriber-identification-information obtaining step of obtaining, by said interconnection agreement determining apparatus, subscriber identification information contained in a routing acknowledgement signal received in response to the routing interrogation signal sent in said interrogating step, said subscriber identification information identifying said receiving communication terminal and being changed when said receiving communication terminal changes the carrier to which said receiving communication terminal subscribes;

a carrier identifying step of identifying by said interconnection agreement determining apparatus the carrier to which said receiving communication terminal subscribes, on the basis of the subscriber identification information obtained in said subscriber-identification-information obtaining step; and a storage step of storing short message service interconnection agreement participating carrier information used for determining whether the carrier of the network on which the first switching center exists and the carrier to which a receiving communication terminal subscribes have an interconnection agreement with each other; and said interconnection agreement determining apparatus determines on the basis of the identification made in said carrier identifying step whether said carriers have said short message service interconnection agreement with each other; and further comprising second determination steps of:

identifying by a second interconnection agreement determining apparatus, when receiving a short message reception signal containing the telephone number of said receiving communication terminal, the carrier to which said receiving communication terminal subscribes on the basis of subscriber identification information contained in a routine acknowledgment signal received in response to a routine interrogation signal sent to by said second interconnection agreement determining apparatus; and transferring said short message reception signal from said second interconnection agreement determining apparatus to a location-area switching center that services the area in which said receiving communication terminal is currently located, only if said second interconnection agreement determining apparatus determines that the carrier identified as the carrier to which said receiving communication terminal subscribes and the carrier to which said originating communication terminal subscribes have a short message service interconnection agreement with each other.

* * * * *